Figure 1:
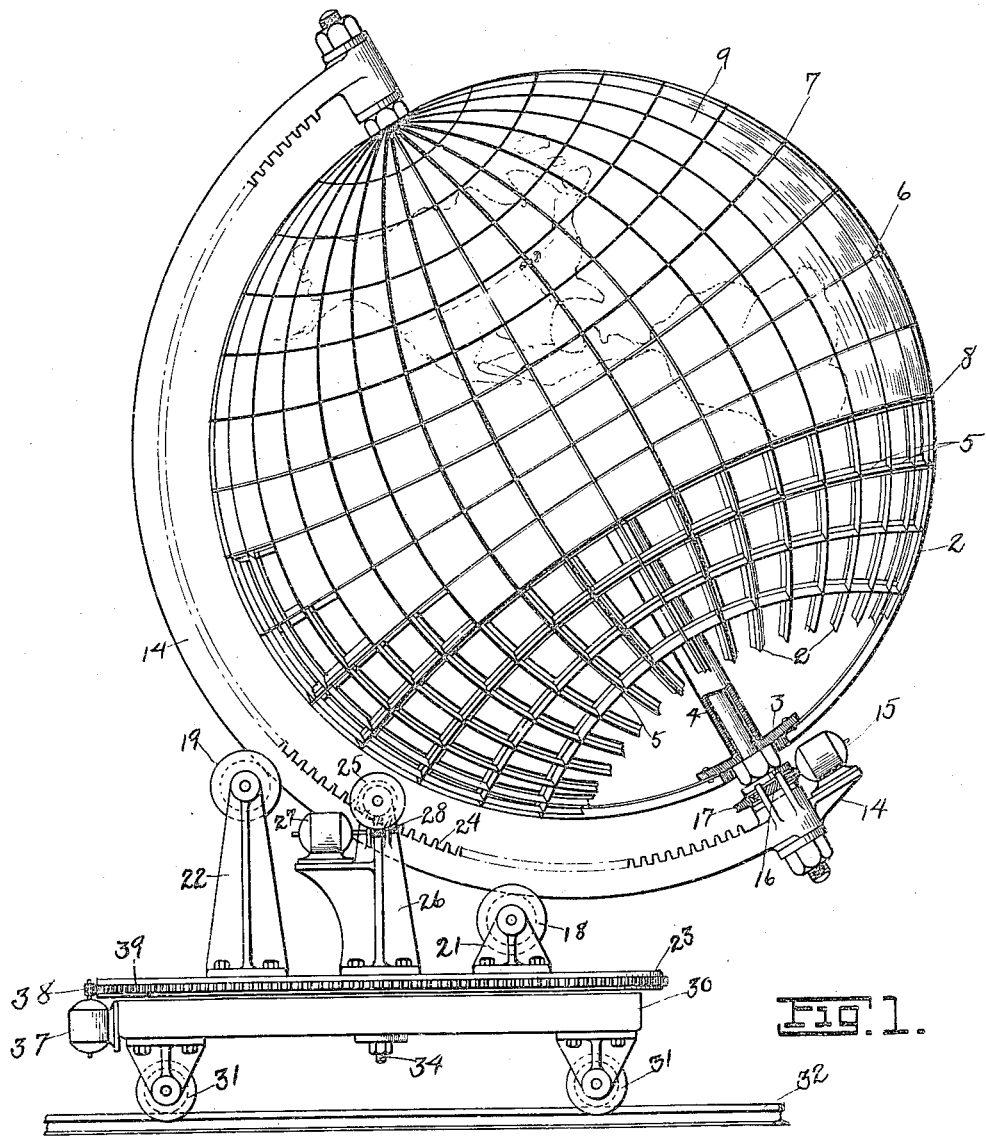

M. MANSON.
GLOBE.
APPLICATION FILED FEB. 10, 1912.

1,042,456.

Patented Oct. 29, 1912.

2 SHEETS—SHEET 2.

WITNESSES
H. J. Pint.
L. L. Dierssen.

INVENTOR
MARSDEN MANSON
BY Miller & White
HIS ATTORNEYS

# UNITED STATES PATENT OFFICE.

MARSDEN MANSON, OF SAN FRANCISCO, CALIFORNIA.

GLOBE.

1,042,456.   Specification of Letters Patent.   Patented Oct. 29, 1912.

Application filed February 10, 1912. Serial No. 676,786.

*To all whom it may concern:*

Be it known that I, MARSDEN MANSON, a citizen of the United States, and a resident of the city and county of San Francisco, State of California, have invented certain new and useful Improvements in Globes, of which the following is a specification.

The invention relates to globes or other spherical bodies and particularly to globes which are to be used for educational purposes, upon the surface of which is represented or impressed delineations or conformations representing the surface of the earth.

The object of the invention is to provide a globe constructed in miniature of the earth, with the surface thereof in relief corresponding to the conformation of the earth.

Another object of the invention is to provide an improved mounting for the globe so that it may be turned to allow its axis to occupy any desired position.

Another object of the invention is to provide a globe comprising a frame; the surface of the globe being formed in sections which are placed in their proper position upon the frame.

The device possesses other advantageous features, which, with the foregoing, will be set forth at length in the following description where I shall outline in full that form of embodiment of the invention which I have selected for illustration in the drawings accompanying and forming part of the present specification. The novelty of the invention will be included in the claims succeeding said description. From this it will be apparent that I do not restrict myself to the showing made by such drawings and description, as I may adopt many variations within the scope of my invention as expressed in said claims.

Figure 3:
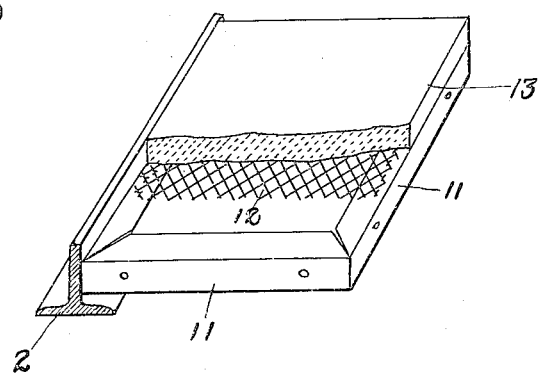
Figure 2:
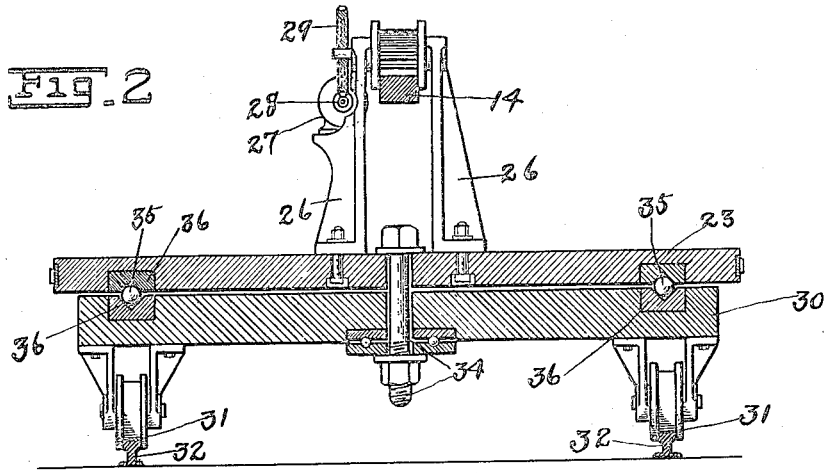

Referring to the drawings:—Figure 1 is an elevation of the globe and its mounting, part of the globe being broken away to disclose the construction, and part of the surface sections being omitted. Fig. 2 is a vertical section through the globe carriage. Fig. 3 is a perspective view of one of the sections, showing its construction.

The globe of the present invention is designed to be used in connection with a method of teaching geography as described in my application for Letters Patent Serial Number 669,673, filed January 5, 1912, but it is to be understood that it may be used for other purposes. According to my method I prefer to employ a globe of substantially one-millionth the size of the earth or approximately forty-two feet in diameter, but I do not desire to restrict myself to any particular size of globe, the size depending upon the use to which the globe is to be put. The globe is constructed of a plurality of semicircular T-irons 2 bearing at their opposite ends in plates or pole pieces 3 which are attached to the shaft or axis 4 of the globe. These T-irons are preferably spaced apart circumferentially fifteen degrees, so that they represent hour meridians, but other spacings may be employed when desired. Mounted on these semi-circular T's 2 are a plurality of short T's 5 which are of such length that they extend from one T 2 to the next and are alined to form parallels of latitude. These short T's are arranged at right angles to the T's 2, and the successive parallels of latitude formed by these T's 5 are spaced apart a suitable distance on the great circle passing through the poles. The spacing of the parallels is preferably such that the spherical quadrangles formed by the parallels and meridians are approximately of equal area. In the drawings I have shown one parallel at the equator 6, parallels at the Tropic of Cancer 7, and at the Tropic of Capricorn 8; the other parallels being arranged intermediate these and the equator and the poles and being spaced apart approximately ten degrees. The globe frame thus formed consists of a plurality of spherical quadrangles, alined parallel to the equator and parallel to the meridians. These spherical quandrangles being formed of T's, the inner flanges of the T's form seats for the surface sections. These surface sections 9, are formed with the curvature of the globe and of such contour to fit the spherical quadrangle into which they are to be placed. The sections 9 are preferably formed of a frame composed of the angles 11 suitably fastened together. Upon the frame is secured a base of metal lath 12, or a similar article, and upon this base is formed the surface 13. The surface is formed of a plastic material and the outer surface thereof is molded into its proper form and contour to represent that particular section of the surface of the earth. The sections 9 are then placed upon the globe frame in their proper positions and are attached to the frame, so that they may not become displaced. The upper edge of the T's remain visible when the sections are in place, thereby providing the meridians and parallels.

The shaft or axis 4 of the globe projects from the poles thereof and is journaled in the semicircular frame piece 14 so that it may rotate therein. The globe is preferably rotated by means of a motor 15 mounted on the frame piece 14. A worm 16 on the motor shaft engages a worm wheel 17 on the shaft 4, so that the rate of rotation of the globe will be comparatively slow. The semicircular frame piece 14 is mounted on flanged rollers 18—19 supported by the standards 21—22 respectively which are mounted upon the bed 23. The piece 14 is provided with a toothed rack 24 which is engaged by the gear 25 supported by the standards 26, which are also secured to the bed. This gear 25 not only serves the purpose of transmitting motion to the frame piece, but holds it secure in the rollers 18—19. The gear 25 is driven from the motor 27, mounted on the standard 26, through the worm 28 and the worm wheel 29. The bed 23 is rotatably arranged upon a carriage 30 provided with wheels 31 engaging tracks 32 so that the globe may be moved bodily in the direction of the tracks.

The bed and carriage are held together by the central bolt 34 and arranged between the two are a plurality of balls 35 in a ball race 36, so that the bed may be revolved on the carriage. A motor 37 on the carriage having a gear 38 engaging a rack 39 on the bed furnishes the motive power for revolving the bed. By this method of mounting the globe it is evident that it may be turned to present any desired portion thereof directly toward the person or persons desiring to examine the same, and the axis of the globe may be arranged in any desired position and the globe caused to rotate about its axis. By combinations of these movements the motions of the earth may be clearly illustrated and a clear conception thereof obtained.

In the construction shown in the drawings I have made the standard 22 higher than standard 21 in order that the frame piece 14 may be rotated to place the axis of the globe in a vertical position, but when greater stability is required or when the apartment in which the globe is placed is not of sufficient size to permit the globe to be manipulated with such mounting, the standards may be of the same height, thus bringing the center of gravity of the globe in line with the center of the bed 23.

I claim:

1. A globe comprising an axial shaft, semicircular members attached to said shaft and spaced apart from each other circumferentially and spherical surface segments lying between the adjacent members.

2. A globe consisting of a spherical frame composed of members arranged in circles at right angles to each other and spaced apart from each other forming a plurality of spherical quadrangles, and a surface segment arranged in each quadrangle.

3. A globe consisting of an axial shaft, semicircular meridian members attached at their ends to said shaft and spaced apart circumferentially of the globe on the line of the equator, a plurality of short members arranged transversely of said semicircular members and forming parallels of latitude, and a plurality of surface segments arranged in the spaces between the members.

4. A globe consisting of an axial shaft, plates secured to the shaft adjacent the ends, semicircular members attached to said plates at their opposite ends and forming meridians, spacing members for said semicircular members arranged at right angles thereto forming spherical quadrangles and a plurality of separately formed surface sections arranged in said quadrangles and secured to said members.

5. In a globe, a spherical frame formed of a plurality of spherical quadrangles and a plurality of surface segments arranged in said quadrangles, said segments being formed of a frame having a covering of plastic material arranged thereon.

6. In a globe, a carriage adapted to travel on wheels, a bed rotatably mounted on said carriage, standards on said bed, rollers journaled in said standards, a semicircular frame piece resting on said rollers, means attached to the bed for moving said frame piece and a globe having projecting polar axes journaled in said frame piece.

7. In a globe, a carriage, a bed rotatably mounted on said carriage, standards of unequal height on said bed, rollers journaled in said standards, a semi-circular frame piece adapted to support the shaft of the globe, movably supported on said rollers and means for moving the bed, the frame-piece and the shaft.

In testimony whereof, I have hereunto set my hand at San Francisco, Cal., this 3rd day of February 1912.

MARSDEN MANSON.

In presence of—
H. G. PROST,
R. HEFFERNAN.